United States Patent
Chanclou et al.

(10) Patent No.: US 10,230,475 B2
(45) Date of Patent: Mar. 12, 2019

(54) METHOD AND DEVICE FOR GENERATING ELECTRICAL SIGNALS CORRESPONDING TO A WAVELENGTH, FROM POLYCHROMATIC OPTICAL SIGNALS

(71) Applicant: Orange, Paris (FR)

(72) Inventors: Philippe Chanclou, Lannion (FR);
Fabienne Saliou, Lannion (FR);
Bertrand Le Guyader, Pommerit-Jaudy (FR)

(73) Assignee: ORANGE, Paris (FR)

( * ) Notice: Subject to any disclaimer, the term of this patent is extended or adjusted under 35 U.S.C. 154(b) by 431 days.

(21) Appl. No.: 14/430,455

(22) PCT Filed: Sep. 18, 2013

(86) PCT No.: PCT/FR2013/052151
§ 371 (c)(1),
(2) Date: Mar. 23, 2015

(87) PCT Pub. No.: WO2014/044969
PCT Pub. Date: Mar. 27, 2014

(65) Prior Publication Data
US 2015/0244460 A1    Aug. 27, 2015

(30) Foreign Application Priority Data

Sep. 21, 2012 (FR) .................. 12 58902

(51) Int. Cl.
*H04B 10/67* (2013.01)
*G02B 6/42* (2006.01)
*H04J 14/02* (2006.01)

(52) U.S. Cl.
CPC ......... *H04B 10/67* (2013.01); *G02B 6/4215* (2013.01); *H04J 14/02* (2013.01); *H04J 14/0282* (2013.01)

(58) Field of Classification Search
CPC .............. H04J 14/02; H04J 14/04; H04B 10/25–10/2581; H04B 10/60–10/6973;
(Continued)

(56) References Cited

U.S. PATENT DOCUMENTS 5,793,912 A * 8/1998 Boord ................ 359/15
6,769,816 B2 * 8/2004 Capewell ......... G02B 6/29367
                                                          385/24
(Continued)

OTHER PUBLICATIONS

International Preliminary Report on Patentability and English translation of the Written Opinion dated Mar. 24, 2015 for corresponding International Patent Application No. PCT/FR2013/052151, filed Sep. 18, 2013.
(Continued)

*Primary Examiner* — Casey L Kretzer
(74) *Attorney, Agent, or Firm* — David D. Brush; Westman, Champlin & Koehler, P.A.

(57) ABSTRACT

A method is provided for generating a plurality of electrical signals from polychromatic optical signals extracted from a set of optical fibers, a polychromatic signal including a plurality of predetermined wavelengths. An electrical signal is generated by using predetermined wavelengths. The method includes: grouping the extracted optical signals together into a polychromatic optical signal beam; separating the polychromatic signal beam into a plurality of monochromatic optical signal beams; and converting the plurality of separated monochromatic optical signal beams into the plurality of electrical signals.

10 Claims, 5 Drawing Sheets

Figure 1:
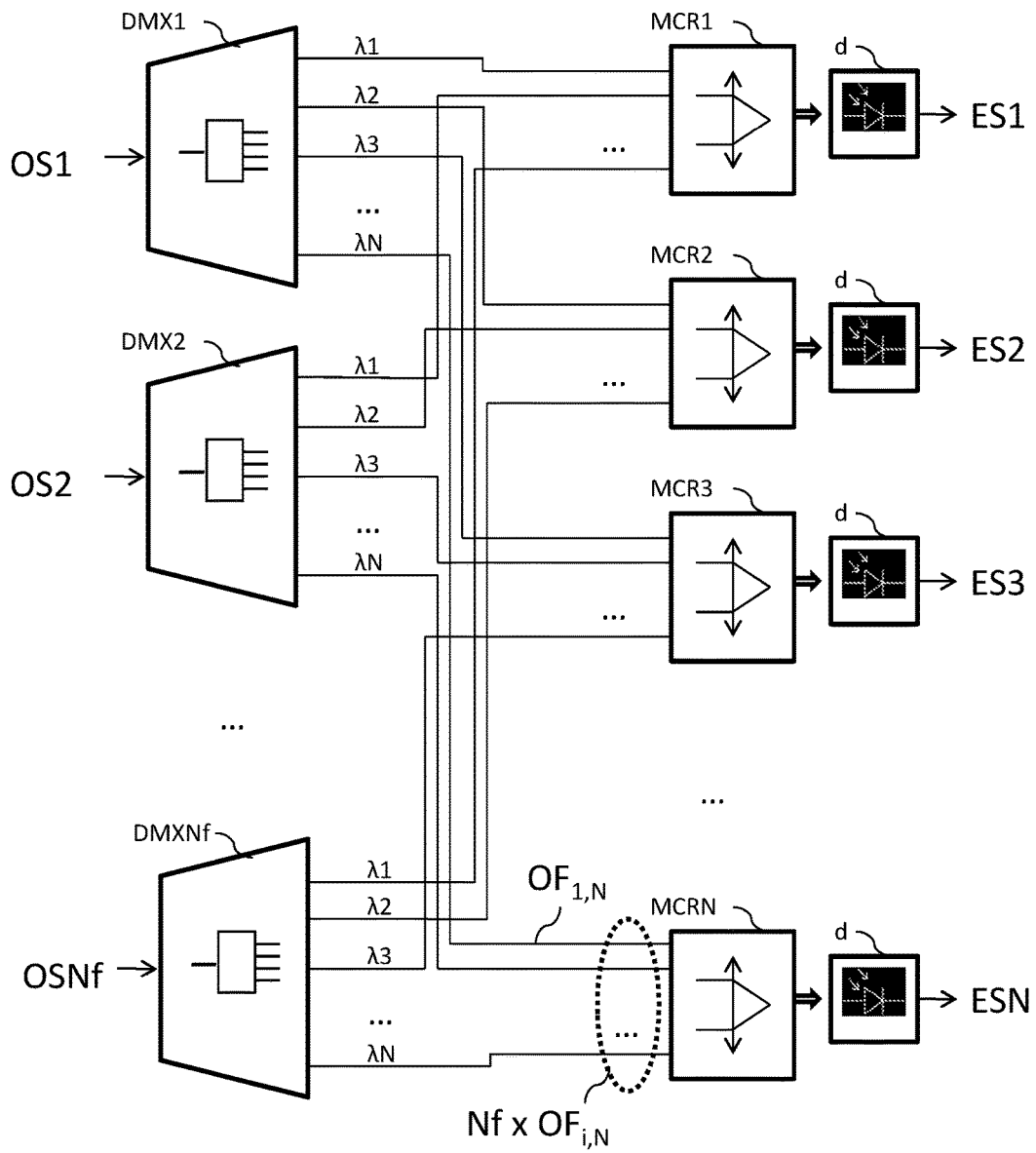

(58) Field of Classification Search
CPC ...... G02B 6/12007; G02B 6/32; G02B 6/124;
G02B 6/4204–6/4218; G02B 6/42–6/43;
H04Q 11/0005; H04Q 2011/0009; H04Q
2011/0016; H04Q 2011/0022; H04Q
2011/0026; H04Q 2011/0007–2011/0035
USPC ...................................................... 385/31–38
See application file for complete search history.

(56) References Cited

U.S. PATENT DOCUMENTS

| | | | | |
|---|---|---|---|---|
| 8,335,432 | B1* | 12/2012 | Darcie | H04J 14/0257 398/58 |
| 2001/0009596 | A1* | 7/2001 | Solgaard | G01J 3/28 385/18 |
| 2006/0120724 | A1* | 6/2006 | Ishimura | H04J 14/0226 398/75 |
| 2010/0111537 | A1* | 5/2010 | Cheng | G02B 6/12004 398/82 |
| 2012/0224861 | A1* | 9/2012 | Winzer | G02B 6/14 398/143 |
| 2013/0194665 | A1* | 8/2013 | Gong | G02B 27/1006 359/491.01 |
| 2014/0233891 | A1* | 8/2014 | Pottier | G02B 27/4244 385/37 |

OTHER PUBLICATIONS

International Search Report and Written Opinion dated Dec. 20, 2013 for corresponding International Application No. PCT/FR2013/052151, filed Sep. 18, 2013.

Kazutaka Hara et al., "Flexible Load Balancing Technique Using Dynamic Wavelength Bandwidth Allocation (DWBA) toward 100Gbit/s-class-WDM/TDM-PON", 36th European Conference and Exhibition on Optical Communication : (ECOC 2010); Torino, Italy, Sep. 19-23, 2010, IEEE, Piscataway, NJ, USA, Sep. 19, 2010 (Sep. 19, 2010), pp. 1-3, XP031789580.

* cited by examiner

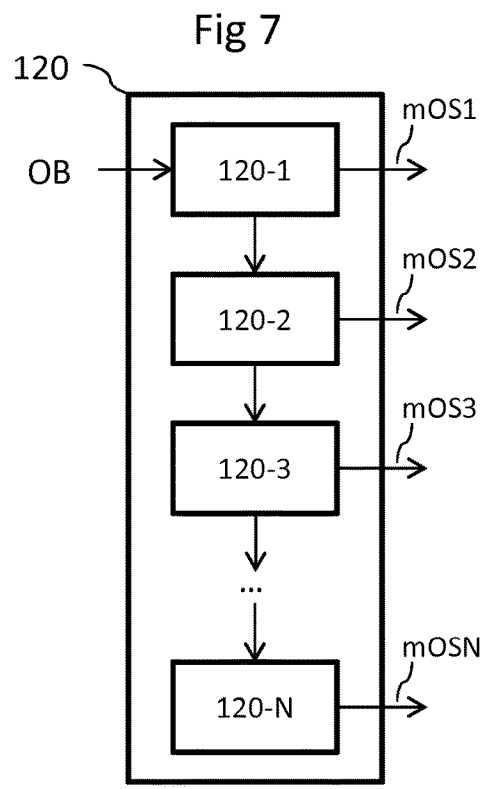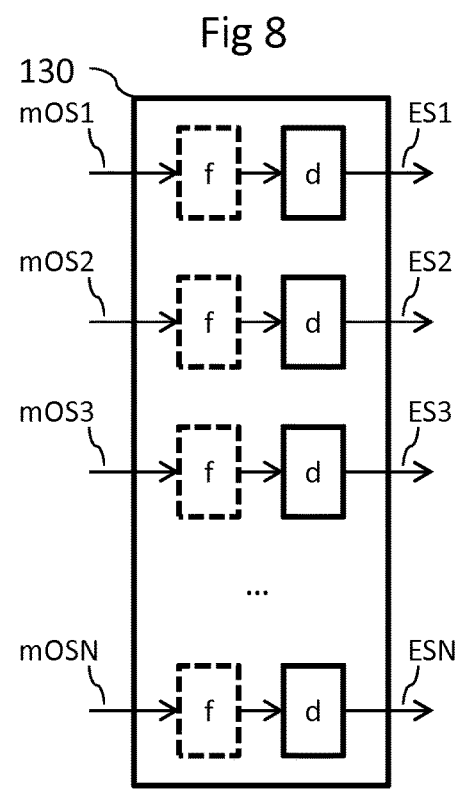

METHOD AND DEVICE FOR GENERATING ELECTRICAL SIGNALS CORRESPONDING TO A WAVELENGTH, FROM POLYCHROMATIC OPTICAL SIGNALS

1. CROSS-REFERENCE TO RELATED APPLICATION

This Application is a Section 371 National Stage Application of International Application No. PCT/FR2013/052151, filed Sep. 18, 2013, the content of which is incorporated herein by reference in its entirety, and published as WO 2014/044969 on Mar. 27, 2014, not in English.

2. FIELD OF THE INVENTION

The application for invention lies in the field of passive optical networks serving subscribers to electronic communication services, and more particularly in that of the passive optical networks with wavelength division multiplexing.

3. PRIOR ART

The optical distribution networks (ODN) are deployed by the electronic communication operators in order to serve all the potential clients of an area. The actual number of subscribers is very often below the potential, which gives incentive to pool several ODNs on one and the same optical interface of an optical line terminal (OLT) at the exchange, and do so in order to improve the fill rate of the optical interface of the OLT and thus limit the investment and operating costs for the operator.

In the case of the ODNs that use the passive optical network (PON) technology grouping time-division multiplexing (TDM) and wavelength division multiplexing (WDM), the uplink optical signals (from the subscribers to the exchange) comprise a number of wavelengths and a number of time windows. A time window is known to those skilled in the art as a "burst". When a number of optical fibers, each corresponding to one ODN, arrive at one and the same OLT, each of the wavelengths has to be extracted from each fiber to be grouped together and to reconstruct a signal corresponding to each wavelength made up of different bursts.

FIG. 1 illustrates a known solution for a system with N wavelengths grouping Nf ODN networks. Typically, a WDM system manages, for example, N=64 or 128 wavelengths. Depending on the subscriber fill ratio for each ODN network, an operator may want to pool up to Nf=4 ODN networks. This solution comprises the following steps:
for each optical signal OSi (i=1 to Nf) at the input, extraction of as many monochromatic optical signals (that is to say with a single wavelength $\lambda j$) as there are wavelengths in the input optical signal, and insertion of the signals on as many optical fibers $OF_{i,j}$ at the output, for example using a wavelength division demultiplexer DMXi,
for each wavelength $\lambda j$, coupling of the corresponding optical fibers $OF_{i,j}$ deriving from the wavelength division demultiplexers DMXi, and insertion, for example, into a coupler MCRj (j=1 to N) comprising a photodiode d at the output, in order to generate an electrical signal ESj dedicated to a single wavelength $\lambda j$.

This technique therefore makes it possible to pool a number of ODNs on one OLT by means of a number of additional optical components. According to this technique, the uplink signal from an ODN network passes first of all through a demultiplexer DMX which extracts it from the optical fiber, is then divided to be reinserted into N intermediate optical fibers, then the signal from each intermediate optical fiber passes through a coupler MCR which extracts it and combines it with Nf−1 other optical signals, before a final conversion into an electrical signal.

The passing of the signals through these additional optical components and these intermediate optical fibers is a significant source of optical losses detracting from the quality, even from the availability, of the service for the subscribers. These optical losses are typically 4 dB for a demultiplexer and of the order of 1 dB for a coupler.

One aim of the invention is to remedy the drawbacks of the prior art.

4. SUMMARY

The invention improves the situation by the use of a method for generating a plurality of electrical signals from polychromatic optical signals extracted from a set of optical fibers, a polychromatic optical signal comprising a plurality of determined wavelengths, an electrical signal being generated for each determined wavelength, comprising:
a step of grouping extracted optical signals into a beam of polychromatic optical signals,
a step of separating the beam of polychromatic signals into a plurality of beams of monochromatic optical signals,
a step of converting the plurality of separated monochromatic optical signal beams into the plurality of electrical signals.

For a number Nf of optical fibers at the input, each transporting modulated signals over a number N of wavelengths, such as, for example, the N wavelengths of a WDM system, the method makes it possible to generate at the output N electrical signals without there being any intermediate passage through Nf×N additional optical fibers between the input and the output.

The signals from the Nf incoming fibers are first of all grouped together before being separated into N wavelengths. The wavelength division demultiplexing operations performed for each of the optical fibers at the input according to the prior art are thus avoided. Instead, the method separates a single beam of signals into N wavelengths. The grouping from the incoming fibers can use a waveguide with or without intermediate optical fiber. The separation into N wavelengths does not require recourse to intermediate optical fibers. It will be understood that the Nf×N intermediate optical fibers of the prior art are no longer necessary according to the invention, or are replaced by at most one optical fiber.

The method therefore makes it possible to connect, to one and the same line termination equipment item OLT, in the uplink direction (from the subscribers to the exchange), a number Nf of optical distribution networks ODN using N wavelengths, while avoiding the losses due to the insertions/extractions of optical signals in intermediate optical fibers.

Running counter to the common practices that are applied to isolated WDM systems or to isolated WDM-TDM systems, before the emergence of the need to combine them together, the method reverses the operations of separation and grouping together of the wavelengths.

In effect, the prior art leads a person skilled in the art to perform the operation of grouping together after the operation of obtaining each of the wavelengths from each of the optical fibers at the input of the method. Notably, the known optical couplers, such as, for example, the MCR module of the "GPON MCBOX" from Huawei (protected registered trade mark), or the coupler "MCR G-PON SFP OLT" from Neophotonics (protected registered trade mark) are capable of processing only a single wavelength at a time, which necessitates first demultiplexing the optical signal from each fiber into wavelengths. No known device therefore combines, in this order or any other, a function of multimode multiplexing (grouping step), a function of processing of the wavelength (separation step) and a function of optoelectronic reception (conversion step) of TDM and WDM signals originating from different single-mode fibers.

According to one aspect of the invention, the separation step comprises a step of passing the beam of polychromatic signals through a plurality of glass plates with multilayer treatment, arranged in cascade configuration, a glass plate filtering one of the determined wavelengths and reflecting the other wavelengths, to form a beam of monochromatic optical signals.

The glass plate with multilayer treatment technique (thin film coating filter dedicated to one wavelength) offers the advantage of exhibiting low losses: of the order of 1 dB per plate, when 8 plates are arranged in cascade configuration for a system with 8 wavelengths, for example. This technique is particularly suitable when the spacing between the wavelengths is greater than 20 nm.

According to one aspect of the invention, the separation step comprises a step of reflection of the beam of polychromatic signals in a grating filter emitting the beams of monochromatic optical signals according to a plurality of diffraction angles specific to their wavelength.

The grating filter technique offers the advantage of exhibiting low losses: of the order of 4 dB, for a system with 8 wavelengths, for example. This technique is particularly suitable when the spacing between the wavelengths is of the order of 0.8 nm.

According to one aspect of the invention, the grouping step comprises a step of superposition of the extracted optical signals in a multimode waveguide.

By superposing the optical signals prior to the extraction of the wavelengths, at the output of monomode or multimode fibers, it is possible to use a single multimode waveguide, which allows subsequent processing operations to be carried out by integrated optical components, limiting the optical losses because it makes it possible to limit the number of diopters through which the light passes.

According to one aspect of the invention, the grouping step comprises a step of widening of the beam obtained by optics in free space.

Redimensioning the beam of polychromatic optical signals makes it possible to adapt it to the size of the separation module while using optical components in free space, such as, for example, collimation lenses. The use of components in free space makes it possible to produce devices without significant technological effort, therefore allowing for lower costs, at least for a small number of devices.

According to one aspect of the invention, the conversion step comprises a step of focusing of the beam obtained by optics in free space.

Redimensioning the beam of polychromatic optical signals makes it possible to adapt it to the size of the photodiodes used for the conversion, while using optical components in free space, such as, for example, focusing lenses. The use of components in free space makes it possible to produce devices without significant technological effort, therefore allowing for lower costs, at least for a small number of devices.

According to one aspect of the invention, the grouping and separation steps are performed by integrated optical components, and the separation step comprises a step of passing of the beam of polychromatic signals through a plurality of glass plates with multilayer treatment, arranged in cascade configuration, a glass plate deflecting one of the determined wavelengths to form a beam of monochromatic optical signals, and filtering the other wavelengths.

When all the components implementing the method are integrated optical components, the maximum effectiveness in terms of loss minimization is achieved. This aspect makes it possible also to keep the dimension of the optical beams to a minimum size, which avoids having to refocus the beam to adapt it to the conversion step.

The different aspects of the method which have just been described can be implemented independently of one another or in combination with one another.

The invention relates also to a device for generating a plurality of electrical signals from polychromatic optical signals extracted from a set of optical fibers, a polychromatic optical signal comprising a plurality of determined wavelengths, an electrical signal being generated for each determined wavelength, comprising:
 a module for grouping extracted optical signals into a beam of polychromatic optical signals,
 a module for separating the beam of polychromatic signals into a plurality of beams of monochromatic optical signals,
 a module for converting the plurality of beams of separated monochromatic optical signals into the plurality of electrical signals.

The invention relates finally to an optical line terminal reception module, comprising the device for generating a plurality of electrical signals which has just been described.

5. DESCRIPTION OF THE FIGURES

Figure 2:
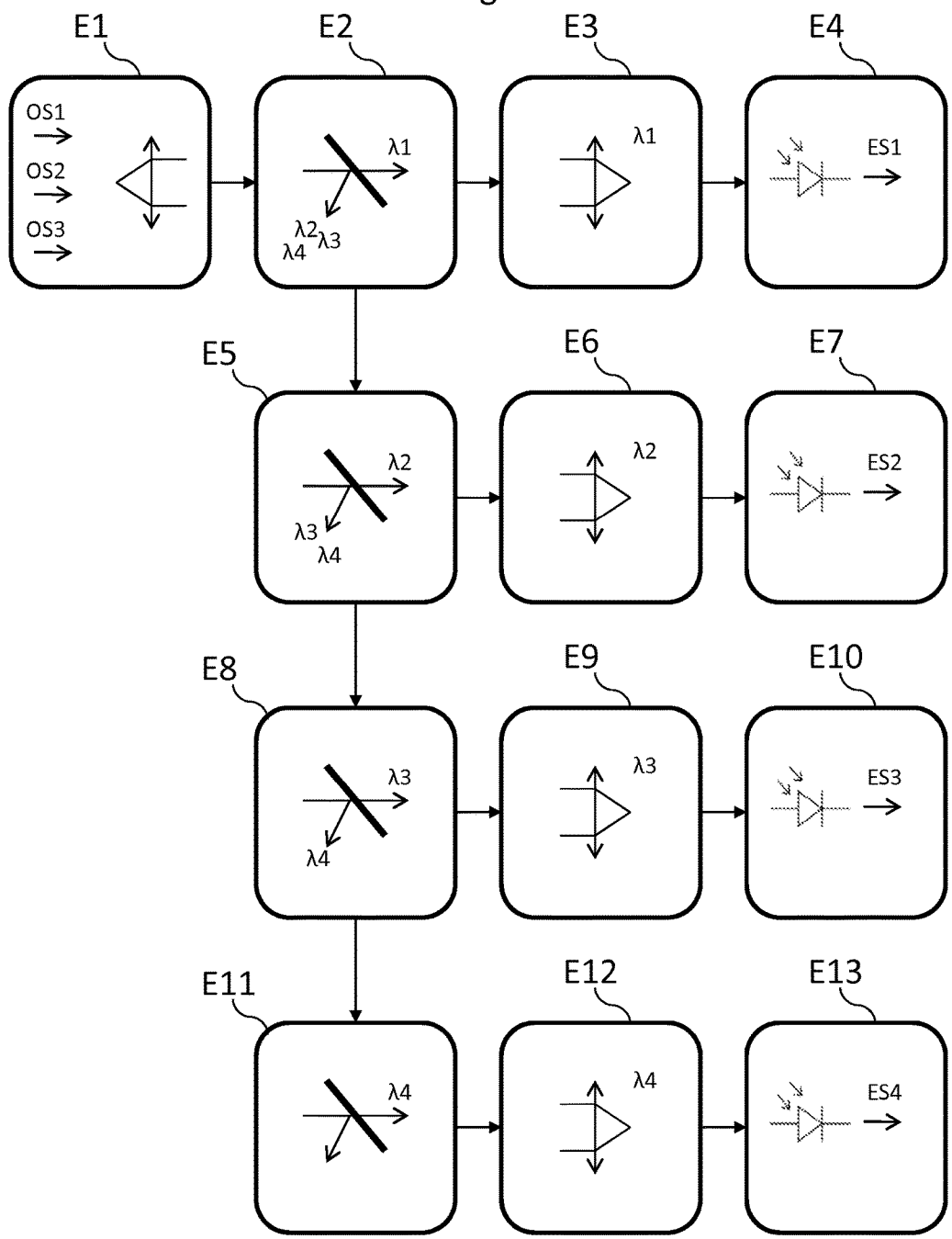
Figure 3:
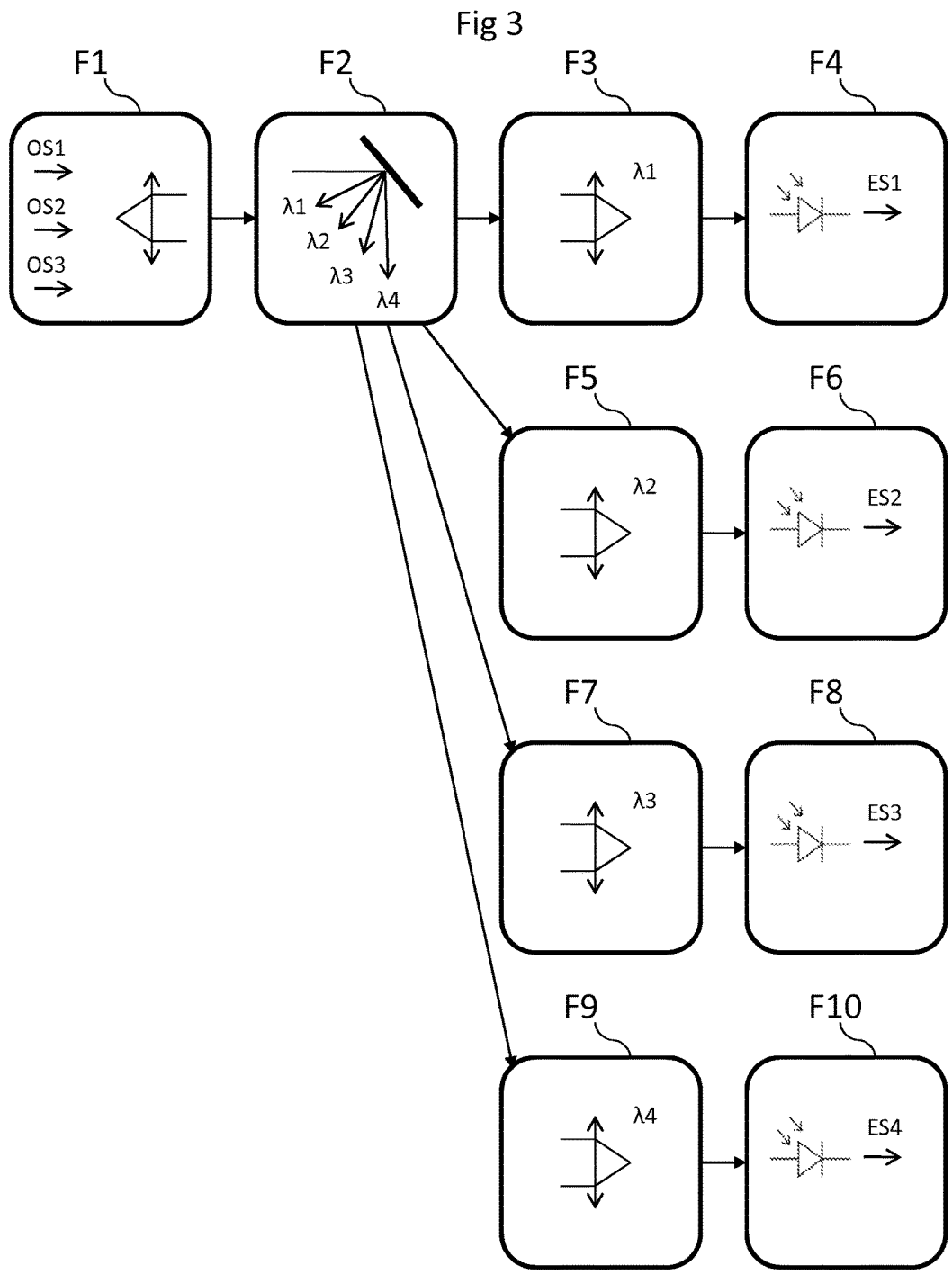
Figure 4:
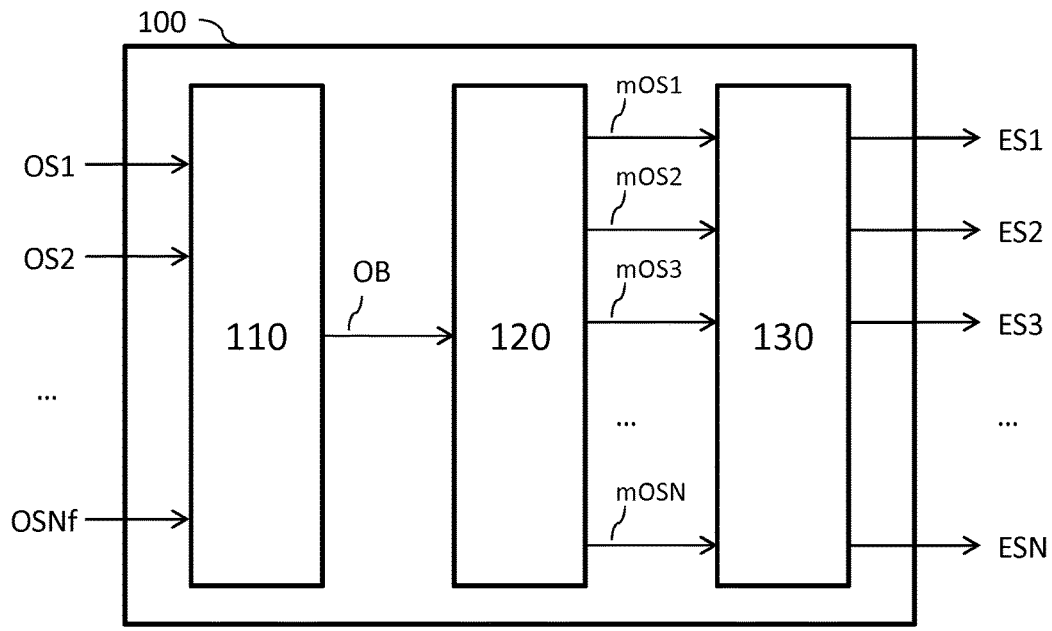
Figure 5:
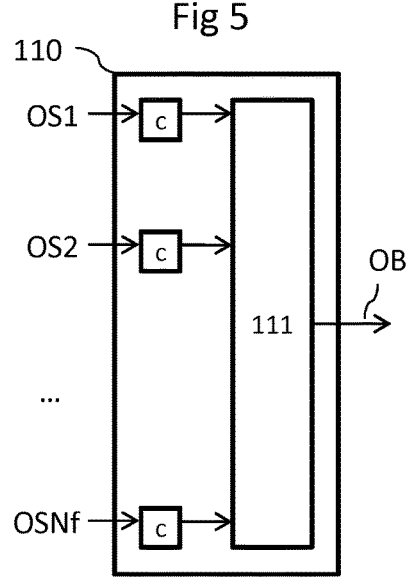
Figure 6:
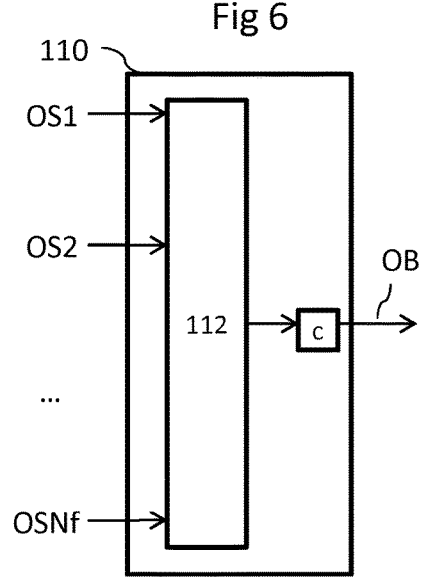

Other advantages and features of the invention will become more clearly apparent on reading the following description of a particular embodiment of the invention, given as a simple illustrative and nonlimiting example, and the attached drawings, among which:

FIG. 1 presents an exemplary configuration of a system for coupling optical fibers with a number of wavelengths, according to the prior art, FIG. 2 presents an exemplary implementation of the method for generating a plurality of electrical signals from polychromatic optical signals extracted from a set of optical fibers, according to a first embodiment of the invention, FIG. 3 presents an exemplary implementation of the same method, according to a second embodiment of the invention, FIG. 4 presents an exemplary structure of a device for generating a plurality of electrical signals from polychromatic optical signals extracted from a set of optical fibers, according to one aspect of the invention, FIG. 5 presents an embodiment of a module for grouping together optical signals into a beam of polychromatic optical signals, according to one aspect of the invention, FIG. 6 presents another embodiment of a module for grouping together optical signals into a beam of polychromatic optical signals, according to one aspect of the invention, FIG. 7 presents an embodiment of a module for separating a beam of polychromatic signals into a plurality of beams of monochromatic optical signals, according to one aspect of the invention, FIG. 8 presents an embodiment of a module for converting a plurality of beams of monochromatic optical signals into a plurality of electrical signals, according to one aspect of the invention.

6. DETAILED DESCRIPTION OF AT LEAST ONE EMBODIMENT OF THE INVENTION

Hereinafter in the description, a number of embodiments of the invention are presented in the case of passive optical networks (PON) with time-division multiplexing (TDM) and wavelength-division multiplexing (WDM), with single-mode or multimode fibers, but the invention applies also to protection schemes for the WDM transmission systems that allow for pooling or redundancy.

FIG. 1, presenting an exemplary configuration of a system for coupling optical fibers with a number of wavelengths, according to the prior art, has been described previously.

In the following exemplary implementations of the method for generating a plurality of electrical signals from optical signals extracted from a set of optical fibers, the value of the number of ODN networks to be pooled, and therefore the number of polychromatic optical signals at the input, is set at 3, and the value of the number of wavelengths of the WDM system is set at 4 ($\lambda 1$, $\lambda 2$, $\lambda 3$, $\lambda 4$), for illustration purposes.

FIG. 2 presents an exemplary implementation of the method for generating a plurality of electrical signals from polychromatic optical signals extracted from a set of optical fibers, according to a first embodiment of the invention.

In a step E1, each polychromatic optical signal OS1, OS2 and OS3 is widened to achieve a given size, for example using a collimation lens for each signal, and the duly widened optical signals are arranged and grouped together in a beam of predetermined size.

In a step E2, the beam of polychromatic signals passes through a first optical filter set to separate the light of wavelength $\lambda 1$ from the rest of the light of the beam, a filter for which the size of the beam has been predetermined. This filter is, for example, a glass plate with multilayer treatment dedicated to the wavelength $\lambda 1$, allowing this wavelength to pass and reflecting the others.

In a step E3, the separated monochromatic beam, consisting of the light filtered at the wavelength $\lambda 1$, is focused to reduce its size, for example using a focusing lens for each of the light rays from the signals OSi.

In a step E4, the focus beam is converted into an electrical signal ES1 by projection onto the sensitive surface of a photodiode.

In a step E5, the beam reflected in the step E2 passes through a second optical filter set to separate the light of wavelength $\lambda 2$ from the rest of the light of the beam. This filter is, for example, a glass plate with multilayer treatment dedicated to the wavelength $\lambda 2$, allowing this wavelength to pass and reflecting the others.

In a step E6, the separated monochromatic beam, consisting of the light filtered at the wavelength $\lambda 2$, is focused to reduce its size, for example using a focusing lens for each of the light rays from the signal OSi.

In a step E7, the focused beam is converted into an electrical signal ES2 by projection onto the sensitive surface of a photodiode.

In a step E8, the beam reflected in the step E5 passes through a third optical filter set to separate the light of wavelength $\lambda 3$ from the rest of the light of the beam. This filter is, for example, a glass plate with multilayer treatment dedicated to the wavelength $\lambda 3$, allowing this wavelength to pass and reflecting the others.

In a step E9, the separated monochromatic beam, consisting of the light filtered at the wavelength $\lambda 3$, is focused to reduce its size, for example using a focusing lens for each of the light rays from the signals OSi.

In a step E10, the focused beam is converted into an electrical signal ES3 by projection onto the sensitive surface of a photodiode.

In a step E11, the beam reflected in the step E8 passes through a fourth optical filter set to separate the light of wavelength $\lambda 4$ from the rest of the light of the beam. This filter is, for example, a glass plate with multilayer treatment dedicated to the wavelength $\lambda 4$, allowing this wavelength to pass and reflecting the others.

In a step E12, the separated monochromatic beam, consisting of the light filtered at the wavelength $\lambda 4$, is focused to reduce its size, for example using a focusing lens for each of the light rays from the signals OSi.

In a step E13, the focused beam is converted into an electrical signal ES4 by projection onto the sensitive surface of a photodiode.

In an advantageous variant of this first embodiment, the step E1 is replaced by two steps E1a and E1b, not illustrated, and the steps E3, E6, E9 and E12 are replaced respectively by steps E3b, E6b, E9b and E12b, not illustrated, the steps E2, E4, E5, E7, E8, E10, E11 and E13, and the sequencing of the steps remaining identical.

In a step E1a, the polychromatic optical signals OS1, OS2 and OS3 are superposed in a multimode waveguide, for example a multimode optical fiber.

In a step E1b, the superposed signal extracted from the multimode waveguide is widened to achieve a determined size, for example using a single collimation lens, rather than three in the case of the step E1.

Similarly, since the superposition has created a single light ray, this variant makes it possible to use only a single focusing lens instead of four, in each of the subsequent steps E3b, E6b, E9b and E12b.

FIG. 3 presents an exemplary implementation of the method for generating a plurality of electrical signals from polychromatic optical signals extracted from a set of optical fibers, according to a second embodiment of the invention.

In a step F1 similar to the step E1, each polychromatic optical signal OS1, OS2 and OS3 is widened to achieve a given size, for example using a collimation lens for each signal, and the duly widened optical signals are arranged and grouped together in a polychromatic beam of predetermined size.

In a step F2, the beam of polychromatic signals is reflected by an optical filter set to separate the light of each of the wavelengths $\lambda 1$, $\lambda 2$, $\lambda 3$ and $\lambda 4$ into as many beams of monochromatic optical signals, a filter for which the size of the polychromatic beam has been predetermined. This filter is, for example, a grating filter reflecting the monochromatic beams according to angles of incidence dependent on their wavelength.

In a step F3 similar to the step E3, the separated monochromatic beam, consisting of the light filtered at the wavelength $\lambda 1$, is focused to reduce its size, for example using a focusing lens for each of the light rays from the signals OSi.

In a step F4 similar to the step E4, the focused beam is converted into an electrical signal ES1 by projection onto the sensitive surface of a photodiode.

The steps F5 and F6, F7 and F8, and F9 and F10 are carried out in parallel with the steps F3 and F4, steps to which they are identical except that they are applied respectively to the separated beams of wavelengths λ2, λ3 and λ4, and respectively generate the electrical signals ES2, ES3 and ES4.

In an advantageous variant of this second embodiment, the step F1 is replaced by two steps F1a and F1b, not illustrated, and the steps F3, F5, F7 and F9 are replaced respectively by the steps F3b, F5b, F7b and F9b, not illustrated, the steps F2, F4, F6, F8, and F10, and the sequencing of the steps remaining identical.

In a step F1a, the polychromatic optical signals OS1, OS2 and OS3 are superposed in a multimode waveguide, for example a multimode optical fiber.

In a step F1b, the superposed signal extracted from the multimode waveguide is widened to achieve a determined size, for example using a single collimation lens, rather than three in the case of the step F1.

Similarly, since the superposition has created a single light ray, this variant makes it possible to use only a single focusing lens instead of four, in each of the subsequent steps F3b, F5b, F7b and F9b.

According to a third embodiment of the invention, not illustrated, the polychromatic optical signals OS1, OS2 and OS3, whether obtained from single-mode or multimode fibers, are superposed in a multimode waveguide, then the multimode waveguide is subjected to wavelength filtering treatment using an integrated optical component, without passing through optical components in free space used in the first two embodiments which have just been described. This third embodiment presents the advantage of avoiding the signal losses linked to the passage of the beams in free space.

For example, the polychromatic beam, duly superposed and guided, passes through four glass plates with multilayer treatment, arranged in cascade configuration, deflecting the light respectively of wavelengths λ1, λ2, λ3 and λ4 to the sensitive surface of four photodiodes to respectively generate the electrical signals ES1, ES2, ES3 and ES4.

The integrated optics devices are mainly based on the AWG (Arrayed Waveguide Grating) technology. This solution integrates guiding, diffraction, optical phase modification and interference functions.

In relation to FIG. 4, there is now presented an exemplary structure of a device for generating a plurality of electrical signals from optical signals extracted from a set of optical fibers, according to one aspect of the invention.

The device 100 for generating a plurality of electrical signals implements the method for generating a plurality of electrical signals as described above.

Such a device 100 can be incorporated in a reception module of an optical line termination equipment item. The device 100 can also be implemented in an equipment item distinct from the optical line termination equipment item, in an equipment item of the network dedicated or not to the reception of signals from an optical distribution network.

For example, the device 100 comprises the following modules:
- a grouping module 110, suitable for grouping the optical signals OSi (i=1 to Nf) together into an optical beam OB,
- a separation module 120, suitable for separating the optical beam OB into monochromatic optical signals mOSj (j=1 to N), each corresponding to a determined wavelength,
- a conversion module 130, suitable for converting optical signals mOSj into as many electrical signals ESj.

FIG. 5 presents an embodiment of the grouping module 110. In this embodiment, the module 110 comprises, for example, the following units:

- collimation units c, suitable for widening each of the optical signals OSi, from optical fibers, using collimation lenses,
- a grouping unit 111, suitable for grouping the widened optical signals together into an optical beam (OB).

FIG. 6 presents another embodiment of the grouping module 110. In this embodiment, the module 110 comprises, for example, the following units:
- a grouping unit 112, suitable for grouping the optical signals OSi, from optical fibers, together into an optical beam OB,
- a collimation unit c, suitable for widening the optical beam OB, using a collimation lens.

FIG. 7 presents an embodiment of the separation module 120. In this embodiment, the module 120 comprises, for example, separation units 120-j (j=1 to N), arranged in cascade configuration, each being suitable for separating from the incoming signal a determined wavelength λj to form a monochromatic signal mOSj.

FIG. 8 presents an embodiment of the conversion module 130. In this embodiment, the module 130 comprises, for example, photodiode units d, suitable for converting the incoming optical signals mOSj (j=1 to N) into an electrical signal ESj.

In a variant of this embodiment, the conversion module 130 further comprises focusing units f, suitable for narrowing the incoming optical signals mOSj in order to adapt them to the receiving surface of the photodiode units d.

The modules and units described in relation to FIGS. 4 to 8 can be hardware modules or units.

The exemplary embodiments of the invention which have just been presented are only some of the embodiments that can be envisaged. They show that the invention makes it possible to pool, in a single central equipment item OLT, the management of the uplink direction from a plurality of WDM optical distribution networks, when the actual number of subscribers is less than the capacity planned on each network, without having recourse to intermediate optical processing operations or transfers which are significant sources of signal losses.

The invention claimed is:

1. A method for generating a plurality of electrical signals from polychromatic optical signals extracted from a set of optical fibers, each polychromatic optical signal comprising a plurality of determined wavelengths, an electrical signal being generated for each determined wavelength, wherein the method uses at most one intermediate optical fiber and comprises:
   grouping the polychromatic optical signals into a beam, by superposition of the polychromatic optical signals in a multimode waveguide,
   widening the beam, using optical components in free space,
   separating the beam into a plurality of beams of monochromatic optical signals, and
   converting the plurality of separated beams of monochromatic optical signals into the plurality of electrical signals.

2. The method according to claim 1, wherein the separating comprises passing the beam through a plurality of glass plates with multilayer treatment, arranged in cascade configuration, each glass plate filtering one of the determined wavelengths and reflecting the other wavelengths, to form a beam of monochromatic optical signals.

3. The method according to claim 2, wherein the optical components in free space comprise a collimation lens.

4. The method according to claim 2, wherein the converting comprises focusing the beams of monochromatic optical signals obtained by optical components in free space.

5. The method according to claim 1, wherein the separating comprises diffracting the beam in a grating filter emitting the beams of monochromatic optical signals according to a plurality of diffraction angles specific to the plurality of predetermined wavelengths.

6. The method according to claim 5, wherein the optical components in free space comprise a collimation lens.

7. The method according to claim 5, wherein the converting comprises focusing the beams of monochromatic optical signals obtained by optical components in free space.

8. The method according to claim 1, wherein the grouping and the separating are performed by integrated optical components, and the separating comprises passing the beam of polychromatic signals through a plurality of glass plates with multilayer treatment, arranged in cascade configuration, a glass plate deflecting one of the determined wavelengths to form a beam of monochromatic optical signals, and filtering the other wavelengths.

9. A device for generating a plurality of electrical signals from polychromatic optical signals extracted from a set of optical fibers, each polychromatic optical signal comprising a plurality of determined wavelengths, an electrical signal being generated for each determined wavelength, wherein the device uses at most one intermediate optical fiber and comprises:

a multimode waveguide, which groups the polychromatic optical signals into a beam by superposition of the polychromatic optical signals in the multimode waveguide, optical components in free space, which widen the beam, an optical filter, which separates the beam into a plurality of beams of monochromatic optical signals, and an optical-to-electrical converter, which converts the plurality of separated beams of monochromatic optical signals into the plurality of electrical signals.

10. An optical line terminal reception module, comprising a device for generating a plurality of electrical signals as claimed in claim 9.

* * * * *